July 28, 1925.
E. M. ATKINSON
HANDHOLD ATTACHMENT FOR CONTAINERS
Filed June 9, 1924
1,547,488
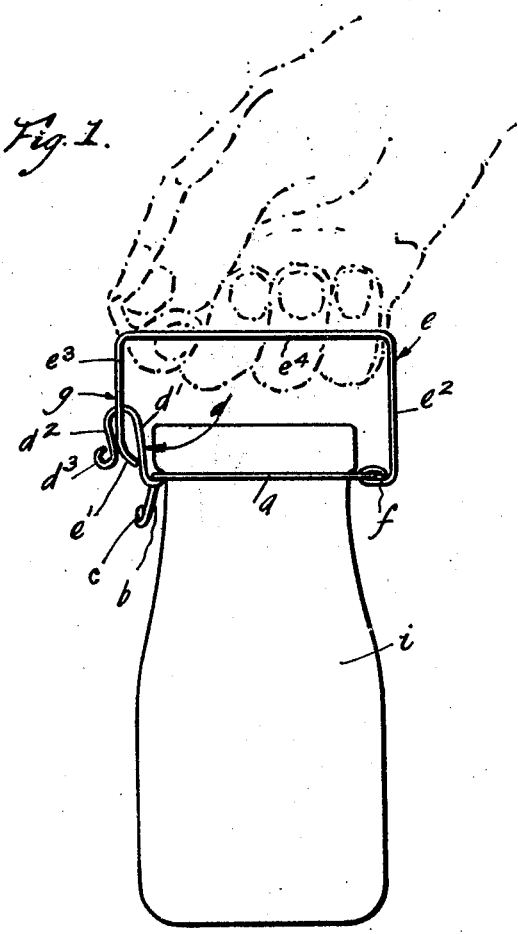
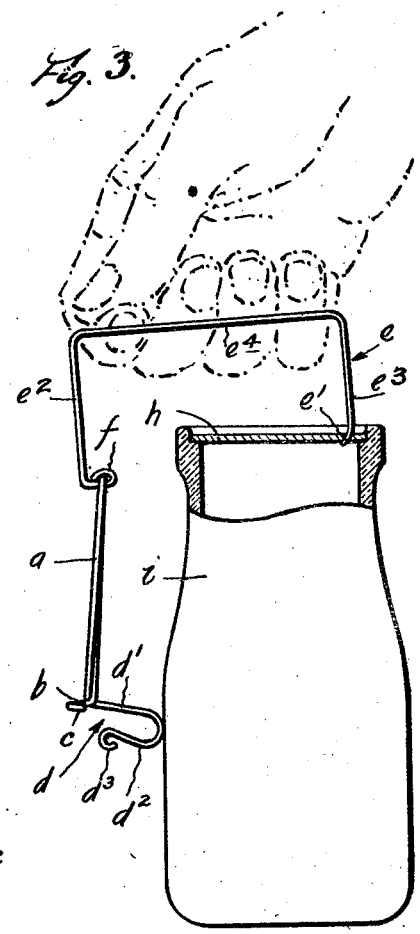
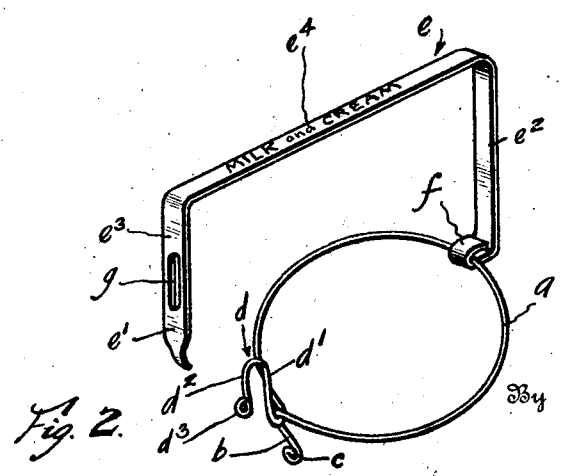
Inventor
Edward M. Atkinson
By *J. J. Geisle*
Attorney Patented July 28, 1925.

1,547,488

UNITED STATES PATENT OFFICE.

EDWARD M. ATKINSON, OF PORTLAND, OREGON.

HANDHOLD ATTACHMENT FOR CONTAINERS.

Application filed June 9, 1924. Serial No. 718,888.

*To all whom it may concern:*

Be it known that I, EDWARD M. ATKINSON, a citizen of the United States, and a resident of Portland, county of Multnomah, and State of Oregon, have invented a new and useful Improvement in Handhold Attachments for Containers, of which the following is a specification.

My invention relates to a device for carrying bottles, jars or other containers and especially to that type of container which is provided with a rim about its mouth.

The object of my invention is to provide an inexpensive readily applied, hand-hold attachment for these containers which will make them easy to carry about.

A further object is to provide a hand hold attachment that can be readily removed from one container and applied to another and a still further object is to provide a device of this character with a handle which may be easily swung out of the way to permit the contents of the container to be removed without disengaging the device from the container.

A further object is to provide a device with a pick-like end which may be used to remove the paper top or cap from a milk bottle, or the like, the handle being made of a flat piece of material of substantial width to permit the necessary strength for the pick-like end, as well as to provide space upon which advertising matter can be placed.

I attain my objects in an attachment comprising an annular loop or neck band made of resilient wire having one end bent in the form of a pendent locking arm, the other end of said loop being formed into an upwardly extending hook projecting radially from the body of the loop and a bail or handle made of a flat piece of metal hingedly connected to said loop at one end and provided at the other with a sharp curved pick-like end for the purpose specified and with an eye adapted to engage said radially projecting hook of said loop.

The foregoing features and others incidental thereto are hereinafter described with reference to the drawings, in which:

Fig. 1 is an elevation of my invention and illustrates the same as applied to a milk or cream bottle of the conventional form, the bail of my attachment being so arranged that it may be conveniently carried by the hand as shown in broken outline in this figure.

Fig. 2 is a perspective elevation of my invention;

Fig. 3 is an elevation of my invention and illustrates how the pick-like end of the handle or bail may be used to remove the top or cap from the container.

My hand hold attachment consists of a looped body or neck band $a$ made of resilient wire having one end made with a pendent locking arm $b$ bent back upon itself and making acute angles with the body of the loop as shown in Fig. 2. The extremity $c$ of this end is tightly coiled in the form of a circle so as to provide a knob, the end of the loop being coiled inside thereof so as to lie within the adjacent portions and thus present no projecting sharp points upon which the finger may be injured. The other end $d$ of the loop is formed into an upwardly extending hook, projecting radially from the body of the loop. The hook $d$ is preferably made with a straight section $d'$ which extends upwardly from the plane of the loop. The remaining portion of the loop $d^2$ is bent back upon said straight section and is adapted to hold the pick like end $e'$ of the handle or bail $e$ tightly in the loop so as to prevent it from becoming inadvertently displaced.

The bail $e$ is made of flat wire and is U-shaped, and is provided with one pendent end or leg $e^2$ which is coiled into an eye $f$ which encircles and engages the loop $a$. The other end also terminates in a pendent leg $e^3$ the end of which is formed to provide the pick-like end $e'$ previously referred to. In this pendent end $e^3$ an aperture $g$ is formed through which the loop $d^2$ may be inserted so as to engage the handle or bail.

As shown in Fig. 2 the flat gripping portion $e^4$ of the bail $e$ is of sufficient length and width that it provides space upon which advertising matter can be inscribed and is of sufficient size that it may be comfortably seized by the hand and may be carried without injury thereto, thus eliminating the necessity of providing an auxiliary covering or grip which would add an additional expense to this device.

In fastening my attachment about a container, the locking arm $b$ of the loop $a$ is sprung so as to engage the other end $d$ of the loop $a$ at a point adjacent the straight section $b'$ of the hook $b$. To disconnect the attachment from the container the locking arm $d$ may be readily sprung out of engagement with said portion by pressing on its knob like extremity $d^3$ with the thumb, the resiliency of the wire tending to aid this disengagement after the hooks $b$ and $d$ have been substantially disengaged.

The bail $e$ is locked over the radially disposed loop $d$ by inserting the curved back portion $d^2$ through the aperture $g$ in the bail. Said portion $d^2$ will then hold the curved pick-like end $e'$ firmly against the straight section $d'$ of the loop $d$ so that this end cannot be inadvertently disengaged therefrom. To disengage the handle so that the contents of the container can be removed without disengaging the attachment therefrom, it is necessary merely to press the knob like extremity $d^3$ upwardly which will spring the loop $d$ to such an extent that this knob-like projection when it coincides with the aperture $g$ will be forced through by the resiliency of the wire. The handle or bail can then be swung about its pivoted connection $f$ so as to uncover the mouth of the container.

As shown in Fig. 3, to remove the paper top $h$ of a standard milk or cream bottle $i$ the device is detached from the neck of the bottle and the curved pick-like end $e'$ may be forced through the cap or alongside thereof so that the handle can be used as a lever to remove the same therefrom. In this operation the handle $e$ is preferably placed against the top of the bottle and fulcrums thereon.

As is well known, the containers for milk and cream have substantially uniform mouth and neck and thus the attachment can be made to grip the neck of any of the containers regardless of its capacity. In order that my device may be used on different sizes of containers, the loop may be made of sufficient size to adapt my device to be fastened thereon. The flexibility and resiliency of the loop $a$ permits a relatively large variation in size. To adapt the attachment to containers of larger or smaller size, it is necessary merely to vary the size of the loops $b$ and $d$ which would lengthen or shorten the loop $a$.

The details of construction above given are those which I believe most practical in the manufacture of my invention, from which the manufacturer may vary as he may deem convenient, provided he adheres to the principle of construction and operation of my invention.

I claim:

1. A removable hand-hold attachment for containers, comprising an annular loop made of resilient wire having one end bent in the form of a pendent locking arm extending backwardly at an acute angle to the body of the loop, the other end of said loop being formed into an upwardly extending hook projecting radially from the body of the loop, and a U-shaped bail made of a piece of flat wire, one of the pendent ends of said bail being formed with an eye through which said loop is inserted, the other end of the bail being formed with an eye in the flat dimension of said wire adapted to be engaged with said radially projecting hook portion of said loop, the free end of said bail being formed with a pick-like end adapted to be used as an instrument for removing the top of the containers.

2. A removable hand-hold attachment for containers comprising an annular loop made of resilient wire having one end bent in the form of a pendent locking arm extending backwardly at an acute angle to the body of the loop, the other end of said loop being formed into an upwardly extending hook projecting radially from the body of the loop and a U-shaped bail made of a piece of flat wire, one of the pendent ends of said bail being formed with an eye through which said loop is inserted, the other end of the bail being formed with an eye in the flat dimension of said wire adapted to be engaged with said radially projecting hook portion of said loop, the free end of said bail being formed with a curved pick-like end adapted to be used as an instrument for removing the top of the containers.

3. A removable hand-hold attachment for containers, comprising an annular loop made of resilient wire having one end bent in the form of a pendent locking arm extending backwardly at an acute angle to the body of the loop, the other end of said loop being formed into an upwardly extending hook projecting radially from the body of the loop, and a U-shaped bail made of a piece of flat wire, one of the pendent ends of said bail being formed with an eye through which said loop is inserted, the other end of the bail being formed with an eye in the flat dimension of said wire adapted to be engaged with said radially projecting hook portion of said loop, the free end of said bail being formed with a curved pick-like end adapted to be used as an instrument for removing the top of the containers, the amount of curvature being slightly greater than the diameter of said upwardly extending hook and the aperture in said bail being arranged so that when said upwardly extending hook engages said aperture it holds said curved portion against inadvertent disengagement.

EDWARD M. ATKINSON.